Sept. 28, 1965 P. E. PRESCOTT 3,208,669
COST TOTALIZER
Filed Nov. 7, 1963 2 Sheets-Sheet 1
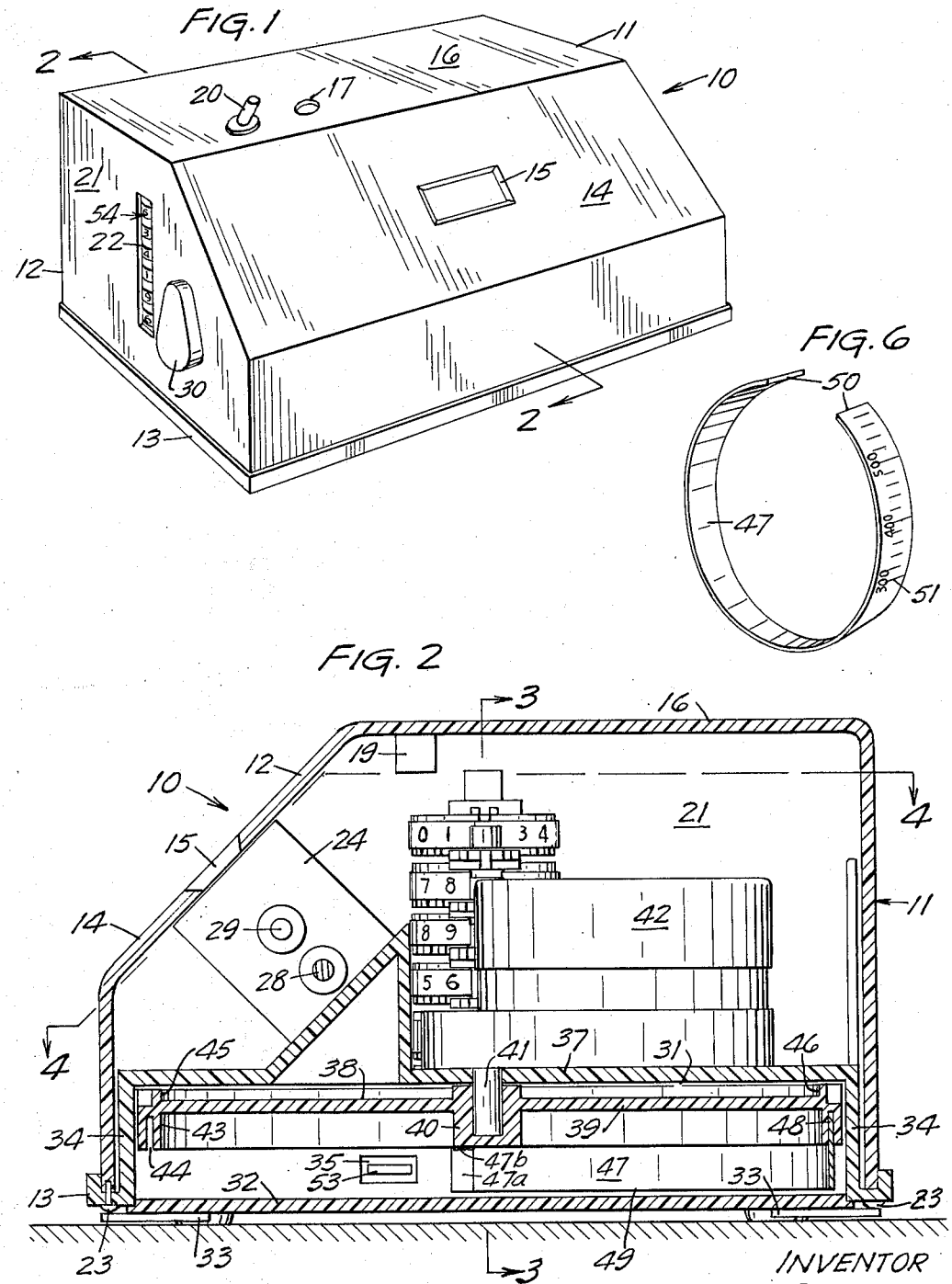
INVENTOR
PAUL E. PRESCOTT
BY
Williamson & Palmatier
ATTORNEYS Sept. 28, 1965 P. E. PRESCOTT 3,208,669
COST TOTALIZER
Filed Nov. 7, 1963 2 Sheets-Sheet 2
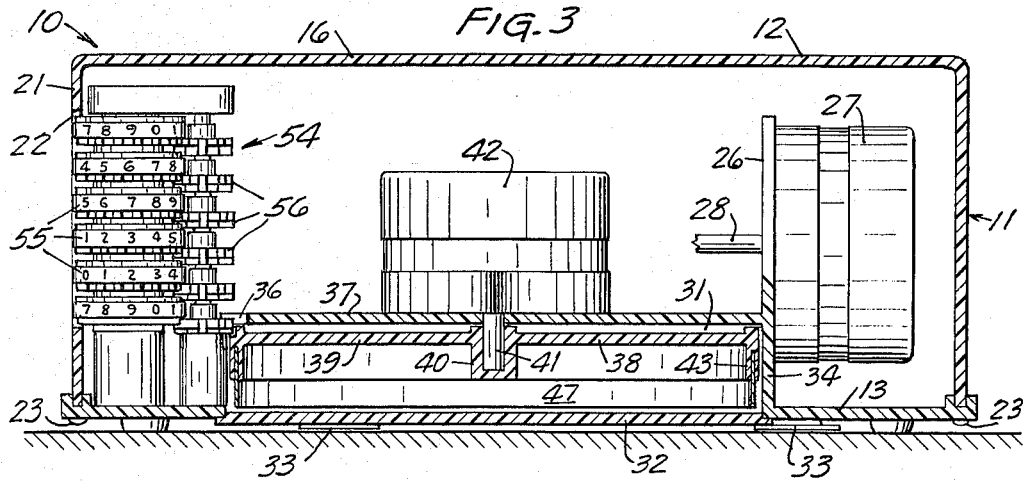
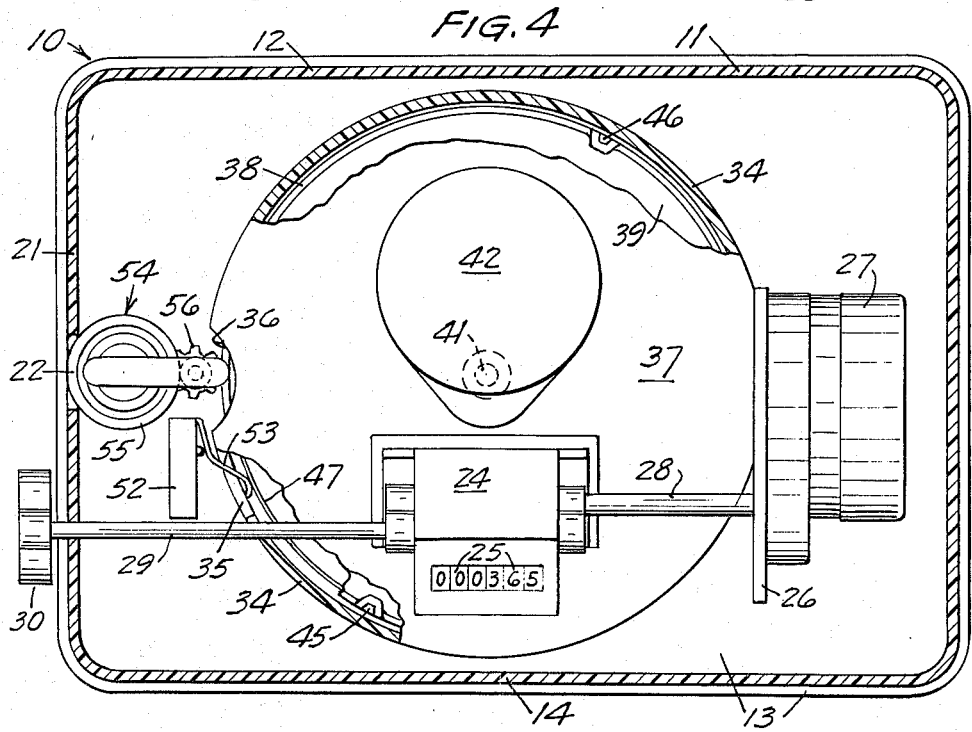
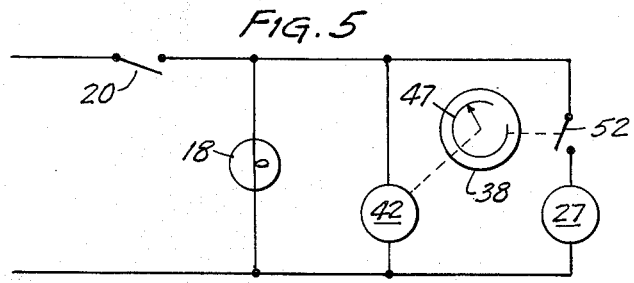
INVENTOR
PAUL E. PRESCOTT
BY
Williamson & Palmatier
ATTORNEYS United States Patent Office 3,208,669
Patented Sept. 28, 1965

3,208,669
COST TOTALIZER
Paul E. Prescott, Excelsior, Minn., assignor to Prescott Manufacturing, Inc., Excelsior, Minn., a corporation of Minnesota
Filed Nov. 7, 1963, Ser. No. 322,114
8 Claims. (Cl. 235—61)

This invention relates to integrating apparatus for measuring elapsed time in terms of another measuring medium based on a predetermined rate per unit of time, which may be subject to change from time to time.

Although apparatus performing this general function has been known in the past, such apparatus has been unduly complicated in relation to the function performed and the normal variation in the rate which is likely to be encountered. This is particularly true as related to application of the apparatus wherein the rate need only be occasionally changed such as in the situation of measuring the accumulated charge for operating a certain printing machine so that the proper charge can be determined for billing to the customer.

An object of my invention is to provide a new and improved integrating apparatus of simple and inexpensive construction and operation for measuring elapsed time in terms of another measuring medium such as accumulated dollars based on a predetermined dollar rate per hour.

Another object of my invention is to provide a novel apparatus which may be readily and easily adjusted so as to permit varying of the rate per hour when the need for such change occasionally arises and to measure the accumulated total over a period of time based upon the desired rate.

Another object of my invention is to provide a new and novel apparatus providing an inexpensive and simple adjustment which may be accomplished through the use of readily available tools in every shop and office so as to accumulate a total over an elapsed time based upon a predetermined rate which may be subject to change from time to time depending upon the use of the apparatus.

These and other objects and advantages of my invention will more fully appear from the following description made in connection with the accompanying drawings wherein like reference characters refer to similar parts throughout the several views and in which:

FIG. 1 is a perspective view of the invention;
FIG. 2 is a section view taken approximately at 2—2 in FIG. 1;
FIG. 3 is a section view taken approximately at 3—3 in FIG. 2;
FIG. 4 is a section view taken approximately along a broken line as indicated at 4—4 in FIG. 2;
FIG. 5 is an electromechanical diagrammatic sketch illustrating the circuitry; and
FIG. 6 is a detailed perspective view illustrating the control cam.

One form of the present invention is shown in the drawings and is described herein.

The indicating apparatus is indicated in general by numeral 10 and includes a housing 11 which defines the frame for the device. The housing 11 includes a top shell 12 and a base 13. The top shell 12 has an oblique front wall 14 with a viewing port 15 therethrough, and the top wall 16 of the shell 12 also has a port 17 therein through which an indicating light 18, which is mounted on a bracket 19, will be visible. The top wall 16 also mounts a control switch 20. One of the end walls 21 also has a viewing port 22 therein.

The base 13 is affixed onto the lower peripheral edge of the shell 12 by screws 23.

A mechanical counter 24 of conventional design and responsive to a rotary input is affixed on the base 13 with the indicating dials 25 disposed in confronting relation with the viewing port 15. An upright bracket 26 formed integrally of the molded plastic base 13 mounts a constant speed intermittently operable synchronous timing motor 27, the output shaft 28 of which is connected to the counter 24 for operating the counter. The counter 24 has a rotary shaft 29 also connected thereto which produces resetting of the counter when desired. The shaft 29 extends through the end wall of the shell 12 and has a manually operable control 30 affixed thereon.

The electric synchronous timing motor 27 is of substantially conventional design and is adapted to start substantially instantaneously when power is applied thereto and will stop substantially instantaneously when power is removed.

The base 13 has an enlarged and circular downwardly opening recess 31 formed therein. The recess in the base 13 is normally closed by a readily removable cover 32 which underlies the base 13 and is provided with rotatable fasteners 33 to releasably retain the cover 32 to the base 13. The sidewall 34 of the recess 31 has an access port 35 formed therein and a second access opening 36 is formed partly in the sidewall 34 and partly in the top wall 37 of the recess for purposes hereinafter more fully described. A wheel-like rotor 38 is disposed within the recess 31 and has a flat and substantially disc-shaped body portion 39 and an integrally formed hub 40 which is affixed by means of a friction fit to the output shaft 41 of a second constant speed synchronous timing motor 42 which is mounted directly upon the top wall 37 of the recess. The rotor 38, which is formed of rigid molded plastic has a somewhat enlarged outer peripheral portion 43 with a downwardly opening groove 44 therein. On the upper side of the peripheral portion 43 are formed a pair of gear segments 45 and 46, each of which is provided with a pair of outwardly facing gear teeth.

The rotor 38 carries a control cam 47, which in the form illustrated, consists in an elongate and resilient, thin and readily severable sheet material which is preferably formed of a molded plastic material of such a thickness as may be readily severable with a conventional pair of office scissors, but which is sufficiently stiff and rigid as to resist bending. One edge portion 48 of the strip-shaped cam 47 is disposed within the groove 44 on the periphery of the rotor and the other edge portion 49 of the cam 47 projects outwardly from the rotor periphery in a direction endwise of the rotor. It will be seen that the strip-like cam 47 extends only partially around the periphery of the rotor 38, so that during each revolution of the rotor, the cam 47 will pass in closely spaced and confronting relation with the access opening 35. The end edges 50 of the cam 47 are spaced from each other along the periphery of the rotor 38 so as to provide an open and unobstructed space therebetween which also passes along the access opening 35 during each revolution of the rotor.

A small and relatively narrow strip 47a cooperates with the cam 47 in operating the switch and provides a calibration stop which is secured in the groove 44 by a small quantity of adhesive 47b. The calibration strip 47a of proper width is selected in testing operation of the machine and may be varied slightly in width by the amount of a few thousandths of an inch so that the replaceable cams 47 will effect operation of the switch for the desired length of time.

In FIG. 6 it will be seen that the cam 47 is provided with indicia 51 defining a scale indicating various values related to the rate per unit of time which the integrating apparatus 10 is to accumulate over a period of time. The indicia 51 are used for the purpose of locating the position at which one end of the cam 47 is to be severed, thereby shortening the length of the cam and lengthening the unobstructed space between the end edges 50.

An on-off switch 52 is mounted upon the base 13 adjacent the access opening 35 in the sidewall 34 of the recess and is provided with a finger-like cam follower 53 which projects through the access opening 35 into engagement with the cam 47. The switch 52 biases the cam follower 53 in a direction inwardly toward the cam 47 which, when engaged, urges the cam follower outwardly, and permits, during each revolution of the rotor, the cam follower to move inwardly into the unobstructed space between the cam end edges 50. The switch is thereby operated on and off during each revolution of the rotor.

A counter 54 is provided for indicating the total operation of the rotor 38. The counter 54 is of substantially conventional design and includes a plurality of counting wheels 55, each of which is provided with gear teeth for driving connection with a pair of the driving gears 56 in a conventional manner so as to produce one rotation of each of the counting wheels 55 for each ten revolutions of the counting wheel immediately therebelow. The lowermost gear 56 is disposed immediately adjacent the rotor 38 at the access opening 36 for intermittent engagement with the gear segments 45 and 46. The counter wheels 55 are visible through the viewing port 22.

In one form of the invention, the synchronous timing motor 42 is constructed so as to have an output speed of 50 r.p.m. for correspondingly revolving the rotor 38 at the identical speed. During each revolution of the rotor 38 the switch 52 will be opened and closed by the cam follower 53 which alternately engages and disengages the cam 47. The synchronous timing motor 47, which in one form of the invention may have an output speed of 25 r.p.m., will be alternately stopped and started for each cycle of rotation of the rotor 38 so as to increase the count indicated by the counter 24 and thereby accumulate a total count on the indicating dials 25 which relates directly to the rate per unit of time which may be varied by adjusting the length of cam 47, and the elapsed time. It will be understood that the integrating apparatus is particularly applicable in computing the charge to be billed to customers for the use of such apparatus as printing machines and the like. When a particular job or operation is being commenced, the counter 24 will have been reset to 0 and substantially simultaneously with the starting of the printing machine or other time to be measured, the switch 20 will be closed so as to commence operation of the integrating apparatus whereupon at any moment, the counter 24 will indicate the cost to the customer of the job being carried on at that particular moment, and when the job is completed, the operator of the printing machine need merely write down the figure denoted by counter 24 which is the actual charge to be billed to the customer for that particular phase of the printing operation.

It will be understood that this integrating apparatus is also applicable in many other situations wherein a total charge is to be computed in relation to a predetermined rate per unit of time and the lapse of a period of time.

It will, of course, be understood that various changes may be made in the form, details, arrangement and proportions of the parts without departing from the scope of my invention which consists of the matter shown and described herein and set forth in the appended claims.

What I claim is:

1. Integrating apparatus indicating an accumulated total over a period of time and based upon a predetermined rate per unit of time,
   comprising a frame,
   a cam support having means for mounting a cam thereon, said support being cyclically movable around a closed and continuous path and said support extending along the periphery of the path,
   means including a constant speed electric motor mounting said support on the frame and continuously and cyclically moving the support around the periphery of said closed path during such a period of time,
   a counter on the frame,
   a constant speed and intermittently operable driving means on the frame and drivably connected with said counter to accumulate a total count on the counter in relatoion to the operating time and rate of said driving means,
   control means having first and second control conditions effecting intermittent application of power to said driving means, said control means including a movable cam follower disposed adjacent the periphery of said closed path and being movable to-and-fro in relation to said periphery to alternately effect said control conditions of the control means and the corresponding intermittent operation of said driving means,
   and a single control cam constructed of thin and readily severable sheet material of a stiff and substantially rigid nature as to resist bending, said control cam being mounted upon said cam support and having an edge portion projecting from the periphery of said path and extending partially therearound and engaging and retaining said cam follower in a predetermined position to effect said first control condition of the control means, said control cam also having end edges spaced from each other around the periphery of said path and defining an open and unobstructed space therebetween to permit movement of said cam follower thereinto during travel of said cam around said closed path and thereby effect the second control condition in said control means, whereby to effect application and removal of power at the driving means during each cycle of travel of said cam and thereby effect a corresponding and uniform operation of the counter during each cycle of travel of the cam, said cam being readily severable to permit shortening of said cam edge portion along the periphery of the path and to lengthen said unobstructed space to change the duration of application of power to the driving means and the corresponding operation of the counter during each cycle of travel of the cam.

2. An integrating apparatus indicating an accumulated total over a period of time and based upon a predetermined rate per unit of time,
   comprising a frame,
   a single rotor having a periphery spaced outwardly from the rotor axis,
   means including a constant speed electric motor mounting and continuously driving said rotor at a predetermined velocity during said period of time,
   a counter on the frame,
   constant speed and intermittently operable driving means on the frame and connected with said counter to effect an accumulation of a total count on the counter in relation to the operating time and rate of said driving means,
   control means having first and second control conditions effecting intermittent application of power to said driving means, said control means including a movable cam follower disposed adjacent the periphery of the rotor and being movable to-and-fro in relation to the rotor periphery to effect said control conditions of the control means and the corresponding intermittent operation of the driving means,
   and a single control cam constructed of thin and readily severable sheet material of a stiff and substantially rigid nature as to resist bending, said control cam being mounted upon said rotor and having an edge portion projecting from the periphery of the rotor and extending partially therearound and engaging and retaining said cam follower in a predetermined position to effect said first control condition of the control means, said portion of said control cam also having end edges spaced from each other along the periphery of the rotor and cooperating with the rotor in defining an open and unobstructed space therebetween to permit movement of the cam follower thereinto during rotation of the rotor and thereby effect the second control condition in said control means, whereby to effect application and removal of power at the driving means during each revolution of the rotor and during predetermined portions of the time of rotation of the rotor and thereby effect a corresponding and uniform operation of the counter during each rotation of the rotor, said sheet material cam being severable to permit shortening of said cam edge portion along the rotary periphery and to lengthen said space to change the duration of application of power to the driving means and the corresponding operation of the counter during each revolution of the rotor.

3. The integrating apparatus of claim 2 wherein said control cam comprises an elongate strip extending partially around the periphery of said rotor, and said rotor having means releasably securing said strip on the periphery thereof.

4. An integrating apparatus indicating an accumulated total over a period of time and based upon a predetermined rate per unit of time,
comprising a frame,
a single rotor having a periphery spaced outwardly from the rotation axis and having a groove in the periphery thereof, said groove facing in a direction endwise of the rotor,
means including a constant speed electric motor mounting and continuously driving said rotor at a predetermined velocity during said period of time,
a counter on the frame,
a constant speed and intermittently operable driving means on the frame and connected with said counter to effect an accumulation of a total count on the counter in relation to the operating time and rate of said driving means,
control means having first and second control conditions effecting intermittent application of power to said driving means, said control means including a movable cam follower disposed adjacent the periphery of the rotor and being movable inwardly and outwardly of the rotor periphery to effect said control conditions of the control means and the corresponding intermittent operation of said driving means,
and a control cam consisting in an elongate strip of thin and readily severable sheet material of a stiff and substantially rigid nature as to resist bending, said strip having opposite edge portions, one of said edge portions extending into and being retained within said groove of the rotor, and the other of said edge portions projecting from the periphery of the rotor in a direction endwise of the rotor and extending partially around the periphery of the rotor in engagement with said cam follower to retain the cam follower in a predetermined position to effect said first control condition of the control means, said control cam also having end edges spaced from each other along the periphery of the rotor and defining an open and unobstructed space therebetween to permit movement of the cam follower thereinto during rotation of the rotor and thereby effect the second control condition in said control means, whereby to effect application and removal of power at the driving means during each revolution of the rotor and during predetermined portions of the time of rotation of the rotor and thereby effect a corresponding and uniform operation of the counter during each rotation of the rotor, said cam being severable to permit shortening thereof with respect to the rotor periphery and lengthening of said unobstructed space to change the duration of application of power to the driving means and the corresponding operation of the counter during each revolution of the rotor.

5. An integrating apparatus indicating an accumulated total over a period of time and based upon a predetermined rate per unit of time,
comprising a frame,
a single rotor having a periphery spaced outwardly from the rotation axis, and having a groove extending entirely around the periphery thereof and opening in an endwise direction of the rotor,
means including a first constant speed electric motor on the frame and mounting and continuously driving said rotor at a predetermined velocity during said period of time,
a counter on the frame,
a second constant speed and intermittently operable electric motor on the frame and connected with the counter to effect an accumulation of a total count on the counter in relation to the operating time and rate of said second motor,
a switch controlling application of power to said second motor and including a movable cam follower adjacent the periphery of the rotor and being movable inwardly and outwardly of said periphery to effect intermittent application of power and intermittent operation of said second motor,
and a single control cam consisting in an elongate strip of thin and readily severable sheet material of a stiff and substantially rigid nature to resist bending, said strip having opposite edge portions, said cam extending partially around the periphery of said rotor with one of said edge portions disposed within said groove and being retained therein and the other of said edge portions projecting from the periphery of the rotor and engaging and retaining said cam follower in a predetermined position to maintain said switch in one operation condition, said cam also having end edges spaced from each other along the periphery of the rotor and defining an open and unobstructed space therebetween to permit movement of the cam follower thereinto during rotation of the rotor and thereby effect another control condition of said switch, whereby to effect application and removal of power to said second motor during each revolution of the rotor and during predetermined portions of the time of rotation of the rotor and thereby effect a corresponding and uniform operation of the counter during each rotation of the rotor, said cam being severable to permit shortening thereof along the rotor periphery and to lengthen said unobstructed space to change the duration of application of power to said second motor and the corresponding operation of the counter during each revolution of the rotor.

6. The integrating apparatus of claim 5 wherein said cam has indicia thereon indicating various rates per unit of time and indicating the locations at which the cam is to be severed to accumulate a total at the desired rate per unit of time.

7. An integrating apparatus indicating an accumulated total over a period of time and based upon a predetermined rate per unit of time,
comprising a housing having an open interior and defining a frame, said housing having an upper portion with a viewing port therethrough, said housing including a base with an enlarged downwardly opening recess therein, the base defining an upright sidewall at the periphery of said recess, said sidewall having an access opening therethrough, an enlarged wheel-like rotor within said recess and having a periphery spaced from the rotor axis and defining a downwardly opening groove extending around said periphery, an on-off switch on the frame and having a switch-operating cam follower projecting through said access opening adjacent the rotor periphery, a control cam consisting in an elongate and resilient, thin and readily severable strip of sheet material of a stiff and substantially rigid nature as to resist bending, said strip having opposite edge portions and extending partially around the periphery of the rotor with one of said edge portions disposed within said peripheral groove and the other of said edge portions projecting downwardly from the periphery of the rotor in engagement with the cam follower of the switch for retaining said cam follower in a predetermined position, means including a first constant speed electric motor on the frame and mounting and continuously driving said rotor at a predetermined velocity during said period of time, a counter within the housing adjacent said viewing port to be visible therethrough, a second constant speed and intermittent operable motor within the housing and connected with said counter to effect an accumulation of total count on the counter in relation to the operating time and rate of said second motor, and said second motor being connected with said switch to be controlled thereby and to be intermittently operated during each revolution of the rotor, the time of operation of said second motor being adapted to be adjusted according to the length of said replaceable and severable control cam, and a readily removable cover on said base and underlying said recess for enclosing said rotor and permitting ready and easy access to the cam to facilitate adjustment of the length of said cam and replacement thereof in accordance with the desired rate per unit time.

8. The invention set forth in claim 7 wherein the upper portion of said housing has a second viewing port therethrough, said rotor having a gear segment on the periphery thereof, said sidewall having an access opening adjacent said gear segment, and a second accumulating counter within the housing and adjacent said second viewing port to be visible therethrough, said second counter having a gear drive engaging the gear segment of the rotor through said second access port in said sidewall, whereby said second counter indicates the total accumulated operation of said rotor, and means for resetting said first mentioned counter.

References Cited by the Examiner

UNITED STATES PATENTS 3,003,687  10/61  Bell _____ 235—61

FOREIGN PATENTS 683,055  10/39  Germany.
662,770  12/51  Great Britain.

LEO SMILOW, *Primary Examiner.*